United States Patent [19]

Winninger

[11] Patent Number: 5,304,003
[45] Date of Patent: Apr. 19, 1994

[54] STICK-ON AQUARIUM THERMOMETERS AND THE LIKE

[75] Inventor: Allan H. Winninger, Franklin Lake, N.J.

[73] Assignee: Willinger Bros., Inc., Oakland, N.J.

[21] Appl. No.: 81,652

[22] Filed: Jun. 23, 1993

[51] Int. Cl.⁵ .................. G01K 1/14; G01K 11/12; G01K 13/00
[52] U.S. Cl. .................................. 374/150; 374/162
[58] Field of Search .................. 374/150, 162, 208

[56] References Cited

U.S. PATENT DOCUMENTS

| 3,864,976 | 2/1975 | Parker | 374/150 |
|---|---|---|---|
| 4,030,482 | 6/1977 | Navato | 374/162 |
| 4,169,378 | 10/1979 | DiMarchi et al. | 374/156 |
| 4,169,382 | 10/1979 | Goldman et al. | 374/194 |
| 4,459,046 | 7/1984 | Spirg | 374/162 |
| 4,460,064 | 8/1984 | D'Luzansky | 374/162 |
| 4,509,533 | 4/1985 | Chervitz | 374/162 |
| 4,538,926 | 9/1985 | Chretien | 374/162 |
| 4,916,386 | 4/1990 | Schultz | 374/150 |
| 5,094,545 | 3/1992 | Larsson et al. | 374/162 |

FOREIGN PATENT DOCUMENTS 2426249 1/1980 France ................... 374/150

OTHER PUBLICATIONS

Coral Lite ™, American Thermometer Co., Inc., Dayton, Ohio (no date).

Primary Examiner—William A. Cuchlinski, Jr.
Assistant Examiner—Diego F. F. Gutierrez
Attorney, Agent, or Firm—Helfgott & Karas

[57] ABSTRACT

An aquarium stick-on liquid crystal thermometer with visual temperature indicator to be viewed through a first wall of an aquarium and including a transparent layer of adhesive over the temperature indicator for attaching the visual material in airtight connection to the exterior of a second wall of the aquarium. The temperature indicators are then viewed through the aquarium water and the aquarium walls. Because of the airtight coupling of the thermometer, the temperature indicators appear clear, bright and distinct when viewed.

9 Claims, 2 Drawing Sheets

STICK-ON AQUARIUM THERMOMETERS AND THE LIKE

BACKGROUND OF THE INVENTION

This invention relates to a stick-on thermometer, and more particularly to a liquid crystal thermometer which can appear clear and distinct even though it is viewed through an aquarium glass wall and even through the water in the aquarium tank. In addition this invention relates to a method of making items clearly visible through the aquarium and through a liquid such as water in an aquarium.

A liquid crystal thermometer is a relatively inexpensive and somewhat unbreakable form of thermometer which has become very popular. In an aquarium, the temperature of the water must be maintained within certain limits in order to provide a safe environment for the fish. Liquid crystal thermometers have been adhesively applied to the exterior surface of the front wall of aquarium tanks and are easy to read in a lighted room. In a dark room, with only an aquarium light turned on, however, the liquid crystal thermometer will not be readable since it is in front of the aquarium glass. Furthermore, the adhesive will not work under water, so the liquid crystal can not be placed inside the tank water against one of the aquarium walls.

If the liquid crystal thermometer is held against the exterior surface of the rear wall of an aquarium, and with the aquarium light turned on, the thermometer will then be readable. However, since it is viewed through the front surface of the aquarium glass and through the water it will appear dull, darkened and difficult to read.

Improvements in viewing the liquid crystal thermometers would be very beneficial both for aesthetic reasons and for easily and accurately reading the water temperature to assure a safe environment for the fish.

SUMMARY OF THE INVENTION

Accordingly, an object of the present invention is to provide a stick-on thermometer which is clearly visible when viewed through a surface of an aquarium and through the water in an aquarium.

Another object of the present invention is to provide a stick-on thermometer which appears clear, bright, and distinct, and is easily readable in a dark room with only an aquarium light.

Briefly, in accordance with the present invention, there is provided a method of making liquid crystal thermometers which are adhered to an exterior surface of an aquarium, clearly visible, bright and distinct, when viewed through a surface of the aquarium and through the water in the aquarium. The method includes forming an airtight coupling between the liquid crystal thermometer and the exterior aquarium surface.

Specifically, a clear adhesive is placed on the face of the stick-on liquid crystal thermometer and used to adhere the thermometer to the aquarium surface without air bubbles. The adhesive acts as a light pipe so there are continuous light transmitting paths from the thermometer through the adhesive and the glass aquarium surface. The thermometer when secured in such air tight arrangement onto the exterior of a rear or side wall of the aquarium, and when viewed through the front of the aquarium, then appears clearly visible, bright, distinct and easy to read.

In one embodiment, the thermometer is provided with an adhesive coating on its front and rear faces with removable transparent covers over the adhesive coatings so that the thermometer can be used on the exterior of either the front, side or rear walls of an aquarium tank. In another embodiment, an insulator is placed on the rear face of the thermometer for thermometers which are to be adhered to the exterior surface of the rear or side walls of an aquarium, the insulator reducing the effect of drafts or of the ambient temperature of the thermometer.

The aforementioned objects, features and advantages of the invention will, in part, be pointed out with particularity, and will, in part become obvious from the following more detailed description of the invention taken, in part, with the drawings which form an integral part thereof.

BRIEF DESCRIPTION OF THE DRAWINGS

In the drawings.

In the various figures of the drawings like reference characters designate like parts.

DETAILED DESCRIPTION OF THE PREFERRED EMBODIMENT

Figure 1:
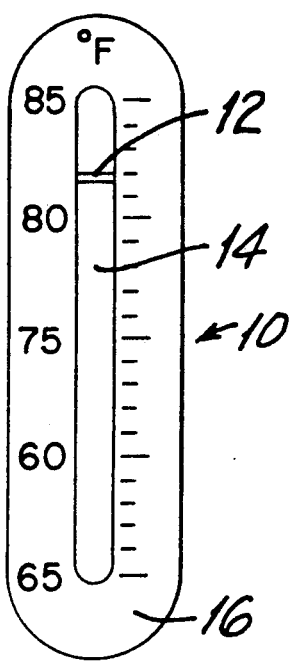
FIG. 1 is a front view of a liquid crystal thermometer in accordance with the present invention.

Referring now to the drawings, in FIG. 1 there is shown a liquid crystal thermometer in accordance with the present invention, generally designated as 10. The thermometer 10 is about 2½ inches in height and 1/64 of an inch in thickness. The temperature is indicated by a bright line 12 which appears in the liquid crystal, as is well known in the art.

Figure 2:
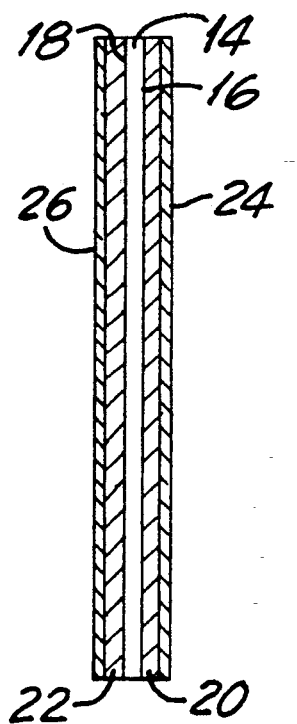
FIG. 2 is a side view of the thermometer shown in FIG. 1 with an expanded width to more clearly show the construction of the thermometer.

Referring to FIG. 2, a side view of the thermometer 10 is shown with an expanded width to more clearly demonstrate the construction of the thermometer. The liquid crystal display 14 in which the bright line 12 appears is embedded in a plastic casing with a front face 16 and rear face 18. Adhesive layers 20 and 22 completely cover the front face and the rear face, respectively. Removable protective covers 24 and 26 cover the adhesive layers 20 and 22, respectively. As will become clear, it is important that adhesive layer 20 covering the front face be of a transparent material.

Figure 3:
FIG. 3 is a side view of a prior art embodiment of a stick-on thermometer.

A prior art liquid crystal thermometer 30 is shown in side view in FIG. 3. The thermometer 30 consists of a liquid crystal display 32 having a front face 34 from which the temperature is read, and a rear face 36. A thin adhesive layer 38 is spread over the rear face 36 and is protected by a removable cover 40 such as a thin piece of plastic.

Figure 5:
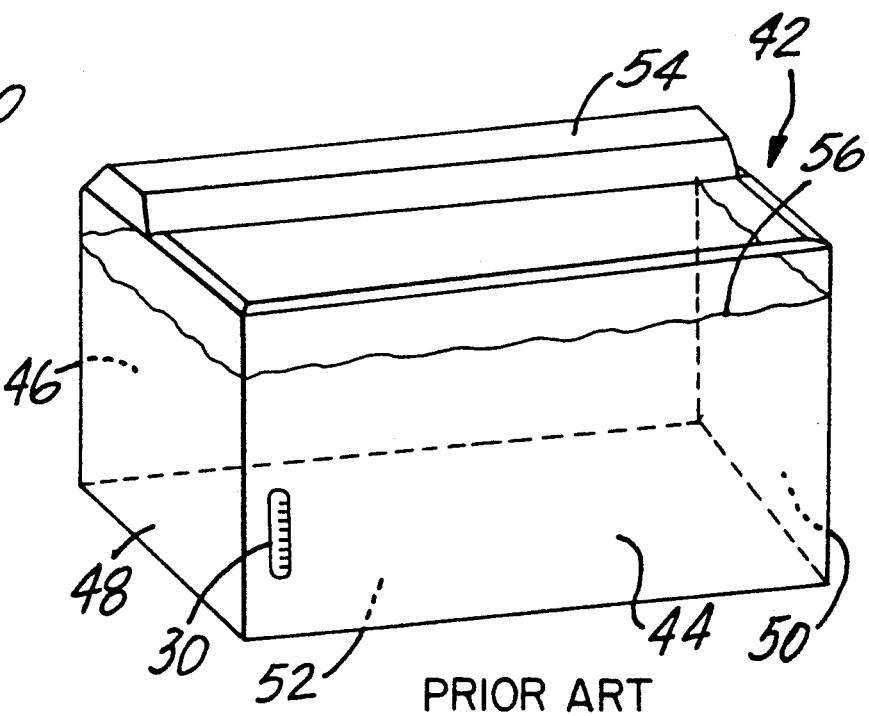
FIG. 5 is a view of an aquarium showing the use of a stick-on thermometer in the prior art.

Referring to FIG. 5, there is shown an aquarium 42 consisting of a typical aquarium construction with front and rear walls 44, 46, respectively, side walls 48, 50, respectively, and a bottom surface 52. An aquarium light 54 is positioned over the walls 48, 50. In accordance with the prior art the thermometer 30 is placed on the exterior of the front wall 52 by removing the removable cover 40 and pressing the thermometer and adhesive 38 against the exterior of the front wall 44. The adhesive holds the stick-on thermometer in place and the temperature of the water 56 is read on the liquid crystal display. It should be appreciated, that in the prior art, the thermometer is placed on the exterior of the tank with its display face directed away from the aquarium tank.

In a darkened room, the display face 32 can not be read. If the aquarium light 54 is turned on, the light makes it even more difficult to read the thermometer than in a lighted room. The rear lighting of the thermometer by the aquarium light gives the effect of making the front face 32 of the thermometer appear even darker. It should also be appreciated that the adhesive material which is used on these thermometers does not permit use under water. Thus, the stick-on thermometer must be placed on the exterior of the tank.

If one were to take the liquid crystal thermometer 30 shown in FIG. 3 and hold it against the outside of the rear wall of the aquarium tank, one would find that looking at the thermometer through the aquarium tank and the tank water makes the thermometer blurry, dull, and unclear. Even if one were to turn on the aquarium light, the clarity of the thermometer is not improved.

It has been unexpectedly found that if one were to "wet" the front surface of the thermometer and then hold it tightly against the rear wall of the aquarium tank, that the thermometer suddenly becomes bright, clear, distinct and easily readable. This is especially so if one then turns on the aquarium light. Presumably, the light travels down the rear wall of the aquarium tank and serves as a light pipe transmitting the light directly to the thermometer. The "wetting" can be water, oil, or other liquid or any other wetting medium. The presence of the "wetting agent" effectively provides an airtight coupling between the front face of the thermometer and the rear wall of the aquarium tank. As such, the light serves to make the reading of the thermometer clear, bright, distinct, and readily readable.

This unexpected result of the improved clarity resulting from the "wetting" of the face of the thermometer is believed to be caused by the substantially airtight connection that is made between the thermometer and the outside of the rear wall of the aquarium tank. This "wetting" resulting in the airtight connection can likewise be duplicated by placing an adhesive coating on the front face of the thermometer and then securing the adhesively coupled thermometer to the outside of the rear wall of the aquarium tank in airtight connection. The airtight connection is made and the readability of the thermometer now becomes clear, bright, distinct, and sharp.

Figure 6:
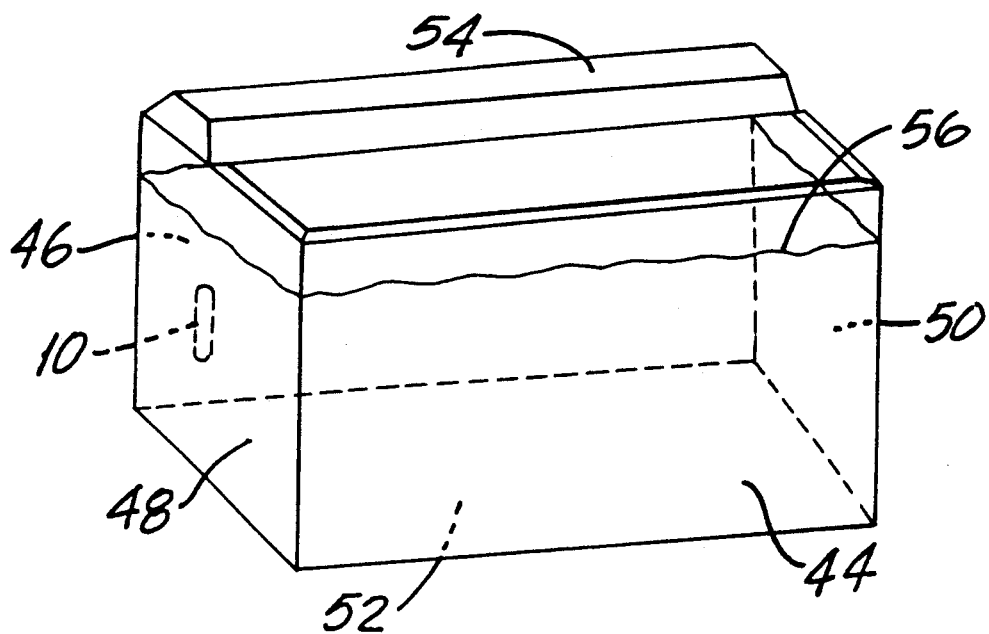
FIG. 6 is a view of an aquarium showing the use of a stick-on thermometer in accordance with the present invention.

Referring to FIG. 6, there is shown an aquarium 42 identical to the aquarium shown in FIG. 5. In accordance with the present invention, thermometer 10 is adhered to the exterior of rear wall 46 by removing the removable cover 24 on the front face and pressing the thermometer 10 against wall 46 so the adhesive 20 causes the thermometer to adhere to the wall. The adhesive layer 20 is substantially uniform as well as transparent. The adhesive layer 20 has no air pockets or spaces so that it acts as a continuous surface between the front of the display 14 and the exterior of rear wall 46. The display 14 is preferably somewhat flexible so that the adhesive can fill in any irregularities in the wall 46. When the thermometer 10 is viewed through the front wall 46 of the aquarium 42, the front face of the display 14 looks bright, clear, distinct, and easy to read.

It should be appreciated, that in the present invention, again the thermometer is placed on the exterior of the tank, however, now the front face is directed toward the inside of the tank. As such, although FIG. 6 shows the thermometer stuck onto the exterior of the rear wall, the thermometer of the present invention could also be placed on the exterior of the side walls 48, 50 with the front face of the thermometer directed towards the inside of the tank.

Figure 7:
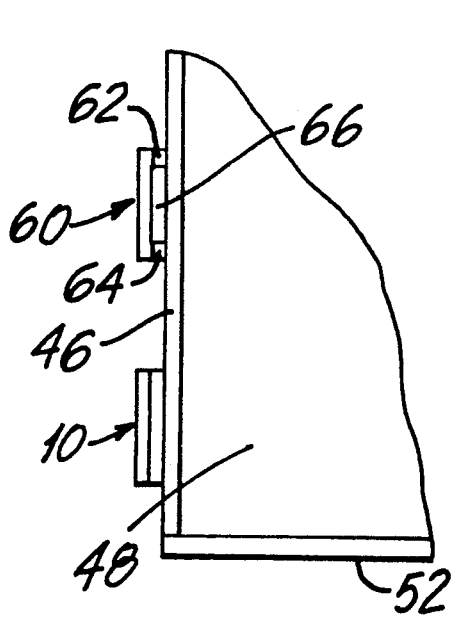
FIG. 7 is a fragmentary side view of the aquarium shown in FIG. 6 depicting two ways of adhering the thermometer to the back side of the aquarium.
Figure 8:
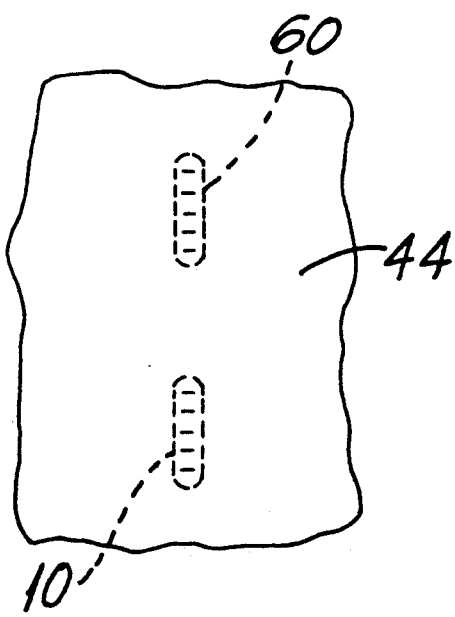
FIG. 8 is a fragmentary front view of the thermometer shown in FIG. 7, looking through the front of the aquarium.

The aforementioned unique result that has been noted when the surface is "wetted" so as to provide an airtight coupling between the thermometer and the aquarium tank can thus be shown in FIGS. 7 and 8.

Referring to FIG. 7, there is shown a fragmentary side view of the aquarium shown in FIG. 6. In addition to the thermometer 10 which is installed in accordance with the present invention with a continuous adhesive surface, a thermometer 60 is shown adhered to the wall 46 with adhesive tape strips 62, 64. However, there is an air space 66 between the thermometer 60 and the wall 46.

Referring to FIG. 8, there is shown a fragmentary front view of the thermometers shown in FIG. 7. The thermometer 10 adhered to the wall 46 is clear and easily readable. The thermometer 60 is dull and hard to read. When aquarium light 54 is turned on, the thermometer 10 appears to light up and is bright, clear, distinct, and easy to read, especially in a darkened room.

Instead of coupling the thermometer 60 with the adhesive tape strips as was shown in the top of FIG. 7, dots, the same difference in effect can be shown even more dramatically if a prior art thermometer were to be retained on the outside of the rear wall with a piece of cellophane tape or other type of tape placed across the back side of the thermometer. In such case again, the front surface of the thermometer is not "wetted" to provide an airtight coupling to the rear wall and again the thermometer will appear blurred and unclear when viewed from the front of the tank.

The embodiment shown in FIG. 2 included the novel adhesive material 20 on the front face of the thermometer for airtight securement of the thermometer to the exterior of the rear or side wall of the aquarium tank and facing toward the interior of the tank. Likewise, it included an adhesive layer 22 along the back face of the thermometer, as in the prior art, should one prefer to utilize the thermometer of the present invention in accordance with that shown in FIG. 5, namely placing it on the exterior surface of the front wall and facing away from the tank, as in the prior art. Thus, the presence of the additional adhesive layer of the present invention while it serves the additional benefit permitting the thermometer to be placed exteriorly onto the back or side wall of the aquarium, nevertheless does not detract from the ability of the thermometer to be utilized in accordance with the prior art, namely being placed on the exterior of the front wall of the aquarium. Thus, the embodiment shown in FIG. 2 permits utilization of the thermometer either placed on the exterior of the front wall or on the exterior of the back or side wall, whichever is preferable to the user.

It should be appreciated, however, that the novel feature of the present invention is the utilization of the "wetted surface", such as the adhesive, on the front face of the thermometer providing an airtight coupling permitting the thermometer to be coupled on the exterior of the rear or side wall of the aquarium tank and facing into the interior of the tank. Combining it with adhesive on the back side as in FIG. 2 adds the additional benefit to permit for flexibility in utilization of the thermometer on the front, back, or side wall, as desired.

Figure 4:
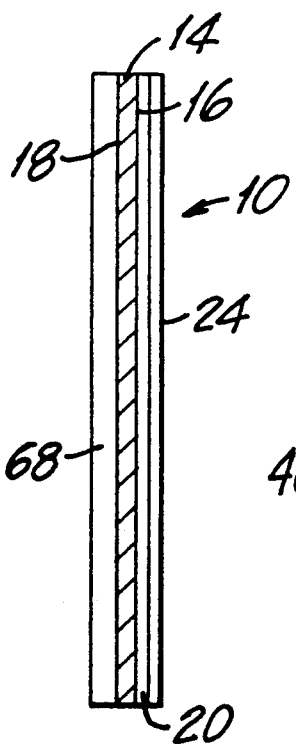
FIG. 4 is a side view of another embodiment of the thermometer shown in FIG. 1.

In FIG. 4, there is shown another embodiment of the thermometer 10 which is particularly suited for use in accordance with the present invention. The thermometer 10 has a display 14 with an adhesive layer 20 only on the front face 16. A removable cover 24 is placed over the adhesive and need not be transparent in this embodiment, since this embodiment is for use only in the exterior surface of the rear or side wall of the aquarium. An insulating layer 68 is placed on the rear face 18 of the display. This insulating layer makes the temperature readings more accurate by insulating the liquid crystal display from ambient temperatures or drafts so that the water temperature is more accurately detected.

There has been described a preferred embodiment and alternate embodiments of the invention and its uses. However, it should be understood that various changes and modifications may be made thereto without departing from the spirit and scope of the invention.

What is claimed is:

1. A liquid crystal thermometer for use in an aquarium, the aquarium having at least a front wall portion, a rear wall portion, and a side wall portion, with water therebetween, the thermometer comprising:
   a front and rear face with visual material on the front face for viewing through the aquarium; and
   a transparent wetting material over the front face of the thermometer and covering the visual material, so that the thermometer may be secured to the exterior of the rear or side wall of the aquarium with the visual material directed to the interior of the aquarium, said wetting material forming a substantially airtight coupling to the rear or side wall portions so that the visual material may be clearly viewed through the front of the aquarium and through the aquarium water.

2. A liquid crystal thermometer according to claim 1, wherein said wetting material is an adhesive layer.

3. The liquid crystal thermometer according to claim 2, wherein:
   said liquid crystal thermometer is a stick-on thermometer and said visual material is temperature indications to be viewed through the aquarium.

4. The liquid crystal thermometer according to claim 3, and further comprising a removable cover over the adhesive layer.

5. The liquid crystal thermometer according to claim 4, and further comprising an insulating layer adhered to the rear face over the thermometer.

6. The liquid crystal thermometer according to claim 4 and further comprising an adhesive layer over the rear face of the thermometer, a removable cover over the adhesive layer on the rear face of the thermometer, and wherein the removable cover over the adhesive layer on the front face is transparent.

7. A stick-on liquid crystal aquarium thermometer for viewing through a front wall of an aquarium, comprising:
   a liquid crystal thermometer having a front face and a rear face, said front face having visual indications of temperature;
   a transparent adhesive layer means on the front face of the thermometer and covering the visual indications for adhesively attaching the thermometer to the exterior of a rear or side wall of the aquarium in an airtight coupling with the front face directed toward the interior of the aquarium; and
   a removable cover over the adhesive layer means, which cover is removed to expose the adhesive for attachment to the aquarium.

8. A stick-on thermometer according to claim 7, and further comprising:
   an insulating layer on the rear face of the thermometer to protect against ambient temperatures and drafts affecting the temperature readings.

9. A stick-on thermometer according to claim 7, and further comprising:
   an adhesive layer on the rear face of the thermometer for alternatively adhesively attaching the thermometer to the exterior of the front wall of the aquarium for direct viewing of the thermometer;
   a removable cover over the adhesive layer on the rear face, which cover is removed to expose the adhesive for attachment to the aquarium with the front face directed away from the aquarium; and
   wherein said cover over the adhesive means on the front face of the thermometer is transparent.

* * * * *

UNITED STATES PATENT AND TRADEMARK OFFICE
CERTIFICATE OF CORRECTION

PATENT NO. : 5,304,003
DATED : April 19, 1994
INVENTOR(S) : Allan H. Willinger

It is certified that error appears in the above-identified patent and that said Letters Patent is hereby corrected as shown below: On the title page, under item [19]

please change "Winninger" to --Willinger--; and in the inventor's line, please change the line to read
--[75] Inventor: Allan H. Willinger, Franklin Lakes, N.J.--.

Signed and Sealed this

Eighteenth Day of October, 1994

Attest:

BRUCE LEHMAN

Attesting Officer

Commissioner of Patents and Trademarks